US009472790B2

(12) United States Patent
Cho

(10) Patent No.: US 9,472,790 B2
(45) Date of Patent: *Oct. 18, 2016

(54) PACKING CASE COMPRISING LAYERS HAVING DIFFERENT COLORS, SECONDARY BATTERY USING THE SAME, AND METHOD OF MANUFACTURING THE SECONDARY BATTERY

(71) Applicant: Samsung SDI Co., Ltd., Yongin-si, Gyeonggi-do (KR)

(72) Inventor: Ja-Kyung Cho, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 120 days.

This patent is subject to a terminal disclaimer.

(21) Appl. No.: 14/105,519

(22) Filed: Dec. 13, 2013

(65) Prior Publication Data

US 2014/0099534 A1  Apr. 10, 2014

Related U.S. Application Data

(63) Continuation of application No. 13/230,731, filed on Sep. 12, 2011, now Pat. No. 8,632,908.

(30) Foreign Application Priority Data

Dec. 16, 2010 (KR) .................. 10-2010-0129289

(51) Int. Cl.
*H01M 2/02* (2006.01)
*H01M 2/04* (2006.01)
*H01M 10/04* (2006.01)

(52) U.S. Cl.
CPC .......... *H01M 2/0292* (2013.01); *H01M 2/021* (2013.01); *H01M 2/026* (2013.01); *H01M2/0212* (2013.01); *H01M 2/0217* (2013.01); *H01M 10/0431* (2013.01); *H01M 10/0436* (2013.01); *Y10T 29/49108* (2015.01)

(58) Field of Classification Search
CPC .... H01M 2/02; H01M 2/0212; H01M 2/021; H01M 2/026; H01M 2/0217; H01M 2/0292
USPC .................................. 429/163, 162; 29/623.1
See application file for complete search history.

(56) References Cited

U.S. PATENT DOCUMENTS 4,436,777 A * 3/1984 Karpiloff ................ B29C 61/02
156/277
2004/0072078 A1 4/2004 Fukuzawa et al.
(Continued)

FOREIGN PATENT DOCUMENTS

JP  06-015985  1/1994
JP  11111250   4/1999
(Continued)

OTHER PUBLICATIONS

Machine Translation of: JP 2005/186153 A, Morita et al., Jul. 14, 2005.*

(Continued)

*Primary Examiner* — Kenneth Douyette
(74) *Attorney, Agent, or Firm* — Knobbe Martens Olson & Bear LLP

(57) ABSTRACT

A packing case for a battery including an inside layer, an outside layer, and a metal layer formed between the inside and outside layers, wherein the outside layer comprises at least one sub-layer having a color different than a color of the metal layer; and a secondary battery including the packing case; and a method of manufacturing the secondary battery.

18 Claims, 7 Drawing Sheets

(56) References Cited

U.S. PATENT DOCUMENTS

| | | |
|---|---|---|
| 2005/0084749 A1 | 4/2005 | Hwang et al. |
| 2007/0009794 A1 | 1/2007 | Takami et al. |
| 2008/0138702 A1 | 6/2008 | Nakamura et al. |
| 2008/0213659 A1* | 9/2008 | Yamada .............. H01M 2/0212 429/181 |

FOREIGN PATENT DOCUMENTS

| | | |
|---|---|---|
| JP | 2005186153 | 7/2005 |
| JP | 2008288212 | 11/2008 |
| KR | 10-0516148 | 1/2005 |
| KR | 10-0692372 | 12/2006 |
| KR | 10-2009-0069141 | 6/2009 |
| KR | 10-2010-0044406 | 4/2010 |

OTHER PUBLICATIONS

Machine Translation of: JP 2008/288212 A, Yamashita et al. Nov. 27, 2008.*

Office Action dated Jun. 6, 2012 in Korean Priority Application No. 10-2010-0129289.

* cited by examiner

PACKING CASE COMPRISING LAYERS HAVING DIFFERENT COLORS, SECONDARY BATTERY USING THE SAME, AND METHOD OF MANUFACTURING THE SECONDARY BATTERY

CROSS-REFERENCE TO RELATED APPLICATIONS

This application is a continuation of U.S. patent application Ser. No. 13/230,731, now U.S. Pat. No. 8,632,908, titled "PACKING CASE COMPRISING LAYERS HAVING DIFFERENT COLORS, SECONDARY BATTERY USING THE SAME, AND METHOD OF MANUFACTURING THE SECONDARY BATTERY" filed on Sep. 12, 2011, which claims the benefit of Korean Patent Application No. 10-2010-0129289, filed on Dec. 16, 2010, in the Korean Intellectual Property Office, the disclosures of which are incorporated herein in their entireties by reference.

BACKGROUND

1. Field

One or more embodiments of the present invention relate to a packing case for a battery, a secondary battery including the same, and a method of manufacturing the secondary battery, and more particularly, to structures of a packing case for a battery, a secondary battery including the same, and a method of manufacturing the secondary battery.

2. Description of the Related Technology

In general, secondary batteries may be chargeable and dischargeable, and are widely used in electronic devices such as mobile phones, laptop computers, camcorders, and the like. In particular, lithium secondary batteries have operating voltages that are about three times higher than those of nickel-cadmium (Ni—Cd) and nickel-hydrogen (Ni-MH) batteries, and have excellent energy densities per unit weight. Thus, there has been much development of the lithium secondary batteries.

Among lithium secondary batteries, lithium ion batteries generally use carbon in a negative electrode, a lithium-based oxide in a positive electrode, and an organic solvent electrolyte in an electrolyte. These types of batteries generate electricity by moving lithium ions between the positive electrode and the negative electrode. In order to overcome a defect of a lithium metal having a low charging and discharging efficiency, lithium ions are sometimes inserted into a carbon layer having a rapid reaction rate and thus rapid charging is made possible.

Lithium secondary batteries may be divided into liquid electrolyte batteries and polymer electrolyte batteries according to electrolyte type. In general, batteries using liquid electrolytes denote lithium ion batteries, and batteries using polymer electrolytes denote lithium polymer batteries.

It may be difficult to identify external defects of an electrode assembly, in which a positive electrode, a negative electrode, and a separator are rolled or stacked, and a packing case for a battery containing an electrolyte.

SUMMARY OF CERTAIN INVENTIVE ASPECTS

One or more embodiments of the present invention include a packing case for a battery, a secondary battery including the same, and a method of manufacturing the secondary battery, whereby external defects generated in the packing case for a battery may be identified.

Additional aspects will be set forth in part in the description which follows and, in part, will be apparent from the description, or may be learned by practice of the presented embodiments.

According to one or more embodiments, a packing case for a battery includes an inside layer having one or more layers; a metal layer formed on the inside layer having one or more layers; and an outside layer having one or more layers formed on the metal layer, wherein the outside layer having one or more layers comprises at least one colored layer.

The colored layer may be black.

The colored layer may have a color complementary to that of an adjacent layer.

The colored layer may have a color complementary to that of the metal layer.

The colored layers may have different colors respectively and be formed of different materials respectively.

The colored layers may have different colors respectively and be formed of the same material.

The outside layer may have more than two colored layers and the colored layers may have complementary colors.

The outside layer having one or more layers may include at least one of a nylon layer and a PET layer formed on the metal layer.

Adhesive layers may be interposed between the metal layer and the nylon layer, between the PET layer and the nylon layer, or between the metal layer and the PET layer.

The adhesive layers may have at least two different colored layers.

The nylon layer may include at least two different colored layers.

The outside layer having one or more layers may include a first adhesive layer, the nylon layer, a second adhesive layer, and the PET layer formed on the metal layer in a sequence.

At least one of the nylon layer, the first adhesive layer, and the second adhesive layer may be black.

At least one of the first adhesive layer, the nylon layer, and the second adhesive layer may have a color complementary to that of the PET layer.

At least one of the first adhesive layer and the second adhesive layer may have at least two different colored layers.

The metal layer may include aluminum.

The outside layer having one or more layers may include at least one of a nylon layer and a PE layer formed on the metal layer.

The outside layer having one or more layers may include the PE layer and the nylon layer formed on the metal layer in a sequence.

The outside layer having one or more layers may include at least one of a PET layer and a PE layer formed on the metal layer.

The outside layer having one or more layers may include the PE layer and the PET layer formed on the metal layer in a sequence.

According to one or more embodiments, a secondary battery includes the packing case for a battery.

According to one or more embodiments, a method of manufacturing a secondary battery includes: examining an outer side of a packing case for a battery; detecting a defect due to a color difference on the outer side of the packing case for a battery; and processing the outer side of the packing case for a battery on which the defect is detected.

According to one or more embodiments, a packing case for a battery includes an inside layer; an outside layer, and a metal layer formed between the inside and outside layers, wherein the outside layer comprises at least one sub-layer having a color different than a color of the metal layer.

One sub-layer of the outside layer may be black.

One sub-layer of the outside layer may have a color complementary to that of an adjacent layer.

One sub-layer of the outside layer may have a color complementary to that of the metal layer.

The sub-layers may have different colors from one another and be formed of different materials from one another.

The colored layers may have different colors from one another and be formed of the same material.

The outside layer may include more than two colored sub-layers and the colored sub-layers may have complementary colors.

The outside layer may include at least one of a nylon sub-layer and a PET sub-layer.

Adhesive layers may be interposed between at least one of the metal layer and the nylon sub-layer, the PET sub-layer and the nylon sub-layer, and the metal layer and the PET sub-layer.

The adhesive layers may each have at least two different colored sub-layers.

The nylon sub-layer may include at least two different colored sub-layers.

The outside layer may include a first adhesive layer, the nylon sub-layer, a second adhesive layer, and the PET sub-layer formed on the metal layer in a sequence.

At least one of the nylon sub-layer, the first adhesive layer, and the second adhesive layer may be black.

At least one of the first adhesive layer, the nylon sub-layer, and the second adhesive layer may have a color complementary to that of the PET sub-layer.

At least one of the first adhesive layer and the second adhesive layer may have at least two different colored sub-layers.

The metal layer may include aluminum.

The outside layer may include at least one of a nylon sub-layer and a PE sub-layer formed on the metal layer.

The outside layer may include the PE sub-layer and the nylon sub-layer formed on the metal layer in a sequence.

The outside layer may include at least one of a PET sub-layer and a PE sub-layer formed on the metal layer.

The outside layer may include the PE sub-layer and the PET sub-layer formed on the metal layer in a sequence.

According to one or more embodiments, a secondary battery includes the packing case for a battery.

According to one or more embodiments, a method of manufacturing a secondary battery includes: examining an outer side of a packing case for a battery; determining the presence of a defect based on an observed color difference between layers of the packing case of the battery; and processing the packing case of the battery on which the defect is determined to be present.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF CERTAIN INVENTIVE EMBODIMENTS

Figure 1:
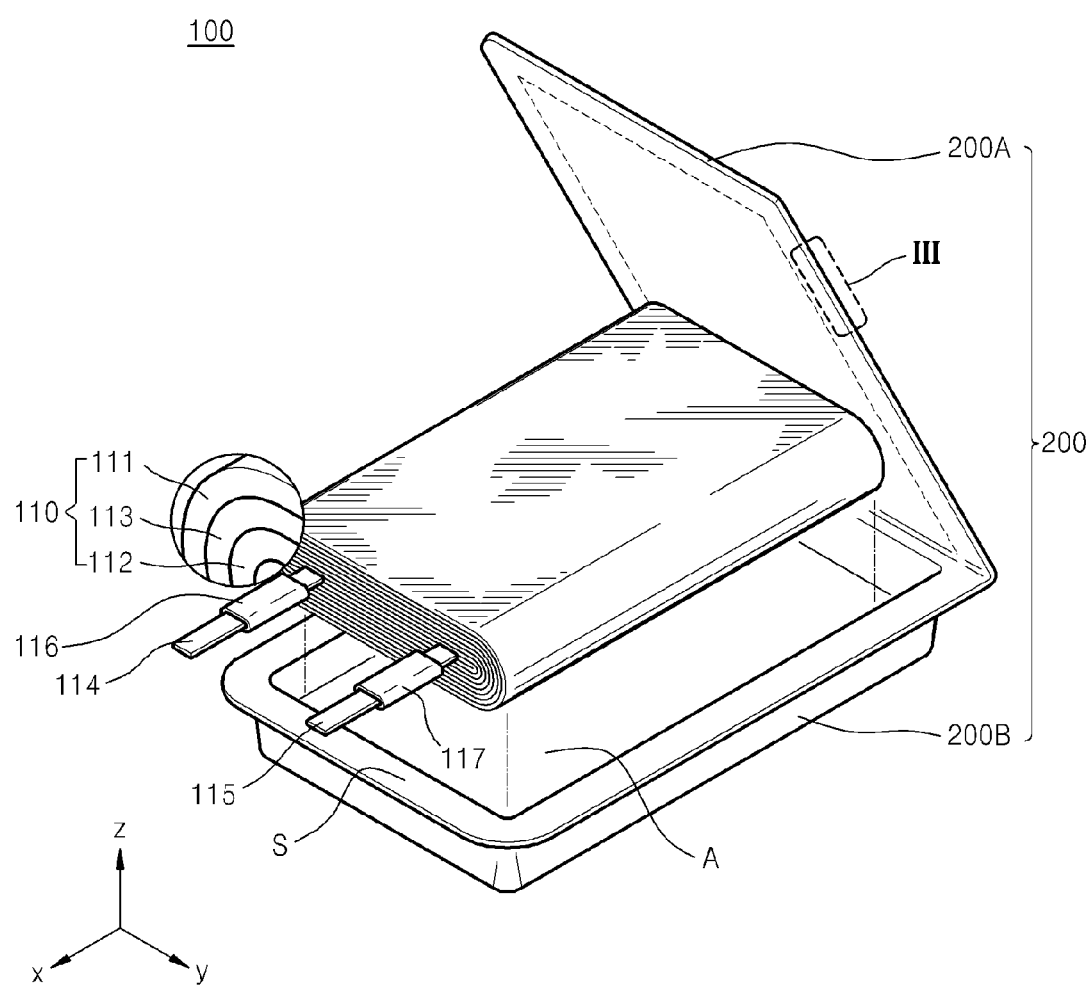
FIG. 1 is an exploded perspective view of an embodiment of a secondary battery.

Reference will now be made in detail to embodiments, examples of which are illustrated in the accompanying drawings, wherein like reference numerals generally refer to like elements throughout. In this regard, the present embodiments may have different forms and should not be construed as being limited to the descriptions set forth herein. Accordingly, the embodiments are merely described below, by referring to the figures, to explain aspects of the present description.

The exemplary embodiments will be described in detail with reference to the accompanying drawings and description of the drawings so as to fully understand advantages and objectives of the inventive concepts. The inventive concepts may, however, be embodied in many different forms and should not be construed as being limited to the embodiments set forth herein. These embodiments are provided so that this disclosure will be thorough and complete, and will fully convey the concept of the invention to those skilled in the art. The terminology used herein is for the purpose of describing particular embodiments only and is not intended to be limiting of exemplary embodiments. As used herein, the singular forms "a," "an," and "the" are intended to include the plural forms as well, unless the context clearly indicates otherwise. It will be further understood that the terms "comprises" and/or "comprising" when used herein, specify the presence of stated elements, steps, operations, and/or components, but do not preclude the presence or addition of one or more other elements, steps, operations, and/or components. It will be understood that, although the terms first, second, etc. may be used herein to describe various elements, these elements should not be limited by these terms. These terms are only used to distinguish one element from another.

Hereinafter, one or more embodiments will be described in detail with reference to the accompanying drawings.

Figure 2:
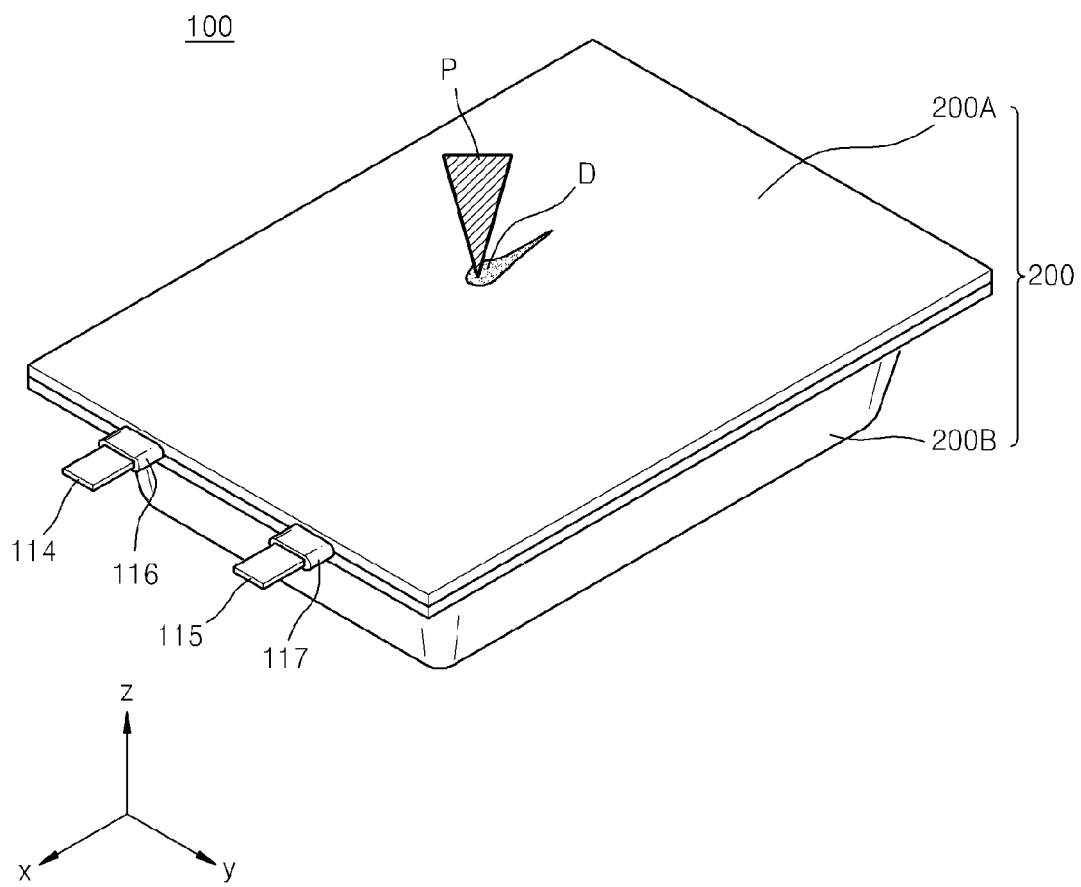
FIG. 2 is an upper side perspective view illustrating that an external defect is generated on a packing case for a battery in a combined state of the secondary battery of FIG. 1.

FIG. 1 is an exploded perspective view of an embodiment of a secondary battery 100 and FIG. 2 is an upper side perspective view illustrating that an external defect is generated on a packing case 200 for a battery in a combined state of the secondary battery 100 of FIG. 1.

Referring to FIG. 1, the packing case 200 for a battery may be a square shape type, a round shape type, or a polymer type. FIG. 1 illustrates the packing case 200 for a battery as a polymer type. The secondary battery 100 may include an electrode assembly 110, an electrolyte (not illustrated), and the packing case 200.

The electrode assembly 110 may include a positive electrode plate 111, a negative electrode plate 112, and a separator 113 interposed between the positive electrode plate 111 and the negative electrode plate 112. In FIG. 1, the electrode assembly 110 is a jelly roll type in which the positive electrode plate 111, the separator 113, and the negative electrode plate 112 are rolled. In other embodiments, the electrode assembly 110 may be formed by stacking the positive electrode plate 111, the separator 113, and the negative electrode plate 112. The electrode assembly 110 may further include a positive electrode tab 114 extended from the positive electrode plate 111 and a negative electrode tab 115 extended from the negative electrode plate 112. An insulating tape 116 for a positive electrode may be disposed on the positive electrode tab 114 and an insulating tape 117 for a negative electrode may be disposed on the negative electrode tab 115. The electrode assembly 110 may be disposed in an inside region A of the packing case 200.

The packing case 200 may contain the electrode assembly 110 and the electrolyte (not illustrated). The packing case 200 may be a flexible pouched case. The packing case 200 may include a first case 200A and a second case 200B. The first case 200A and the second case 200B may each be rectangular and thus have four sides. Referring to FIG. 1, the first case 200A and the second case 200B may be connected to each other by one side. In other embodiments, the first case 200A and the second case 200B may have various other shapes.

Referring to FIG. 2, the first case 200A or the second case 200B may have a defect D due to being scratched by a sharp object P. The defect D generated on the packing case 200 may not be easily identified. A colored layer may be disposed on the packing case 200 so as to easily identify the defect D, as will be described with reference to FIG. 3.

Figure 3:
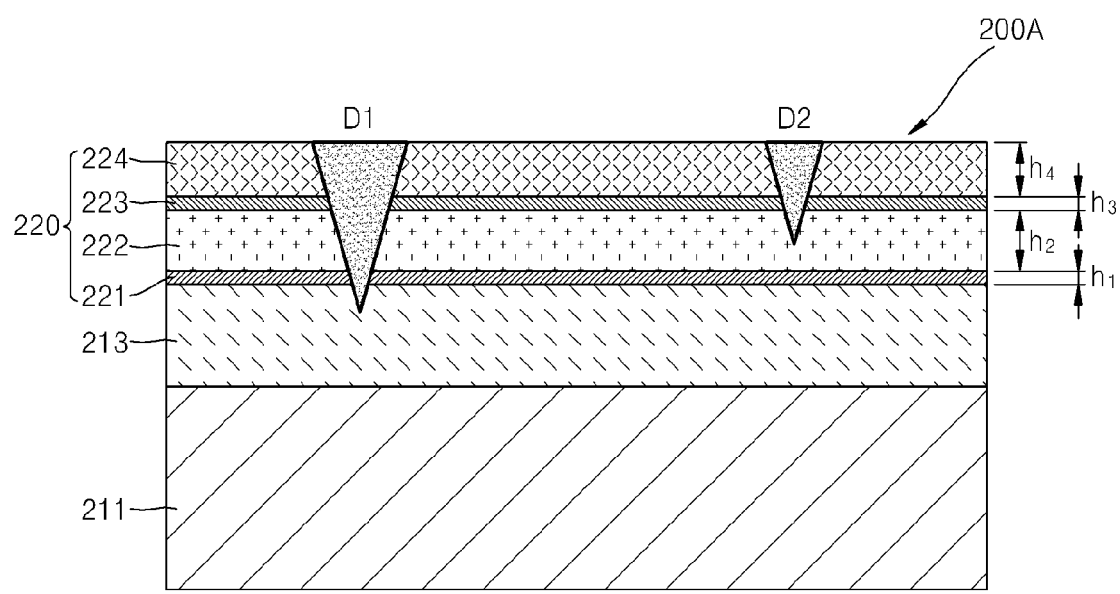
FIG. 3 is a side view illustrating an enlargement of part III of FIG. 1.

FIG. 3 is a side view illustrating an enlargement of part III of FIG. 1. The first case 200A may have a three-layered structure including an inside layer 211, a metal layer 213, and an outside layer 220. In other embodiments, the first case 200A may be formed of other functional layers. The embodiment of FIG. 3 illustrates the first case 200A. In some embodiments, the second case 200B may have the same stacked structure as the first case 200A.

The inside layer 211 may be a thermal bonding layer. Surfaces of the first case 200A and the second case 200B that face each other may be thermal bonding layers. The inside layer 211 may be a polyolepin layer, wherein the polyolepin layer may include casted polypropylene (CPP). The CPP layer may be replaced with a layer formed of a material selected from the group consisting of polypropylene chloride, which is another polyolepin-based resin, polyethylene, an ethylenepropylene copolymer, a copolymer of polyethylene and an acrylic acid, and a copolymer of polypropylene and an acrylic acid.

The inside layer 211 is thermally bonded so as to form a sealing member S (shown in FIG. 1). The surfaces of the first case 200A and the second case 200B that face each other are thermally bonded and sealed so that the electrode assembly 110 and the electrolyte may be sealed therein.

The metal layer 213 maintains mechanical strength and may constitute an outside layer of the packing case 200 according to its metal formability. The metal layer 213 may improve strength of the packing case 200 and protect inside materials by blocking moisture, oxygen, and light from penetrating into the packing case 200. The metal layer 213 may include a material such as stainless or nickel plated steel. In addition, in consideration of light-weight, extensibility, price, and convenience of process, an aluminum (Al) layer may be used as the metal layer 213.

At least one material selected from the group consisting of polyethylene terephtalate (PET), nylon, and polyethtylene (PE), such as high density polyethylene (HDPE), low density polyethylene (LDPE), or linear low density polyethylene (LLDPE), may be interposed between the metal layer 213 and the inside layer 211.

The outside layer 220 may function as a base layer and as a protecting layer. The outside layer 220 may include a single layer or a plurality of layers. The outside layer 220 may include, for example, at least one selected from the group consisting of a nylon layer 222, a PET layer 224, and a PE layer 225 (not shown). The nylon layer 222, the PET layer 224, and the PE layer 225 are examples that may be used to constitute the outside layer 220 but the outside layer 220 is not limited thereto and may be formed of other layers in other embodiments. Also, the outside layer 220 may further include first and second adhesive layers 221 and 223 respectively between each layer. In some embodiments, the first and second adhesive layers 221 and 223 may be formed by, for example, dry lamination.

In FIG. 3, the outside layer 220 may include the first adhesive layer 221, the nylon layer 222, the second adhesive layer 223, and the PET layer 224 formed on the metal layer 213 in a sequence. The first case 200A may have a first defect D1 that exposes the metal layer 213 and a second defect D2 that exposes a portion of the outside layer 220 but not the metal layer 213.

When the first adhesive layer 221, the nylon layer 222, the second adhesive layer 223, and the PET layer 224 have no color and are transparent, and the metal layer 213 has color, an outside observer or a sensor only senses the color of the metal layer 213 and thus it may be difficult to sense a defect. Accordingly, in order to easily detect a defect, the outside layer 220 may include at least one colored layer. Since most metal layers are silver, the colored layer may be black. In some embodiments, the colored layer may have a color complementary to that of the metal layer 213. Also, in FIG. 3, at least one selected from the group consisting of the first adhesive layer 221, the nylon layer 222, the second adhesive layer 223, and the PET layer 224 may be a colored layer. The colored layer may be black or may have a color complementary to that of the metal layer 213. In some embodiments, the nylon layer 222 may be black. When the first defect D1 occurs as shown in FIG. 3, the metal layer 213 is exposed to the outside. When the metal layer 213 includes aluminum, the nylon layer 222, which may be black, and the metal layer 213, which may be silver, contrast each other and thus an observer or a sensor may detect the first defect D1. In some embodiments, not only the nylon layer 222 but also at least one selected from the group consisting of the first adhesive layer 221 and the second adhesive layer 223 may be black. In yet other embodiments, the PET layer 224 may be black.

Since at least one selected from the group consisting of the first adhesive layer 221, the nylon layer 222, the second adhesive layer 223, and the PET layer 224 is a colored layer, at least two layers may be colored layers. In some embodiments, the first adhesive layer 221 and the nylon layer 222 may be colored layers. In other embodiments, the nylon layer 222 and the PET layer 224 may be colored layers. In yet other embodiments, the first adhesive layer 221, the nylon layer 222, the second adhesive layer 223, and the PET layer 224 may each be a colored layer.

The outside layer 220 may include colored layers having different colors. In some embodiments, the colored layers having different colors may be formed of different materials.

When a defect such as the second defect D2 illustrated in FIG. 3, which exposes a portion of the outside layer 220 but not the metal layer 213, occurs, an observer or a sensor may detect the second defect D2 due to the colored layers having different colors. Referring to FIG. 3, if the nylon layer 222 and the PET layer 224 have different colors, an observer or sensor may easily detect that the second defect D2 exposes the nylon layer 222, the second adhesive layer 223, and the PET layer 224. When the PET layer 224 is navy and the nylon layer 222 is yellow, the nylon layer 222 and the PET layer 224 have colors complementary to each other. Thus, an observer or a sensor may easily recognize the second defect D2. In some embodiments, the second adhesive layer 223 may have a color different from those of the PET layer 224 and the nylon layer 222. For example, when the PET layer 224 is navy, the second adhesive layer 223 is wine, and the nylon layer 222 is yellow, colors are exposed according to the depth of the second defect D2, and thus an observer or a sensor may detect not only existence of defects but also the depth of defects through the color exposed.

Figure 4:
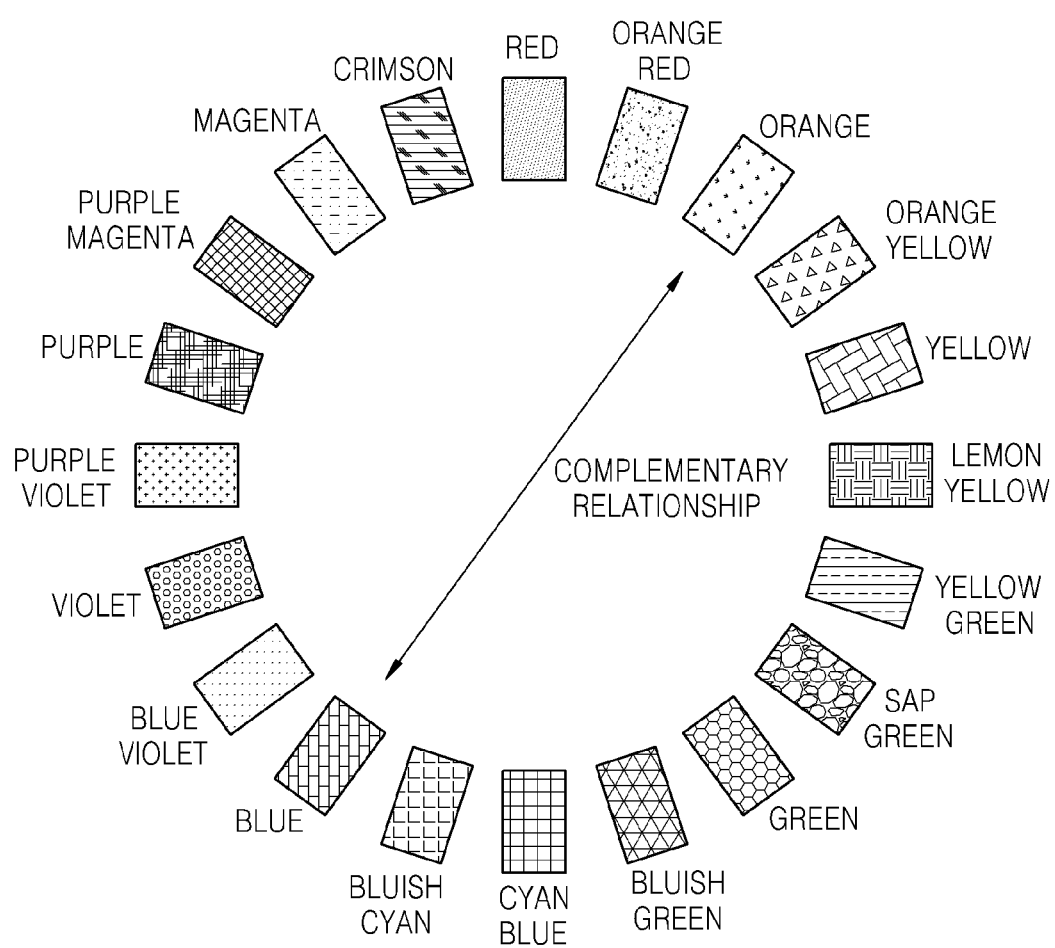
FIG. 4 is a color wheel for illustrating complementary colors.

The colored layers having different colors included in the outside layer 220 are to have colors complementary to each other so that defects may be easily detected when the defects occur. FIG. 4 is a color wheel for illustrating complementary colors. Two different colors are complementary if they become achromatic colors such as black and grey when mixed at an appropriate ratio. Complementary colors face each other in the color wheel. For example, red and blue-green, orange and blue, and yellow-green and purple are complementary color pairs. Although not illustrated in the color wheel, black and white are also complementary colors. Complementary colors are countless, and although not complementary colors, if colors that are nearly complementary to each other are mixed, colors near to black appear. For example, in FIG. 4, deep red and blue are not complementary colors. However, deep red is close to orange, which is a complementary color to blue. Therefore, when blue and deep red are mixed, a color near to black appears.

In this regard, in FIG. 3, when the PET layer 224 is blue and the nylon layer 222 is deep red, and the nylon layer 222 is damaged, the damage may be easily observed due to a contrast between blue and deep red.

In FIG. 3, the first adhesive layer 221, the nylon layer 222, the second adhesive layer 223, and the PET layer 224 may respectively have predetermined thicknesses h1, h2, h3, and h4 so as to protect against damages. In some embodiments, the second adhesive layer 223 may have the thickness h3 so as to protect against damages. FIGS. 5 through 8 are side views illustrating modified examples of FIG. 3. Referring to FIGS. 5 through 8, a single functional layer or a plurality of functional layers may be disposed as the outside layer 220 of FIG. 3. In various embodiments, at least one selected from the group consisting of the nylon layer 222, the PET layer 224, and the PE layer 225 may be disposed.

Figure 5:
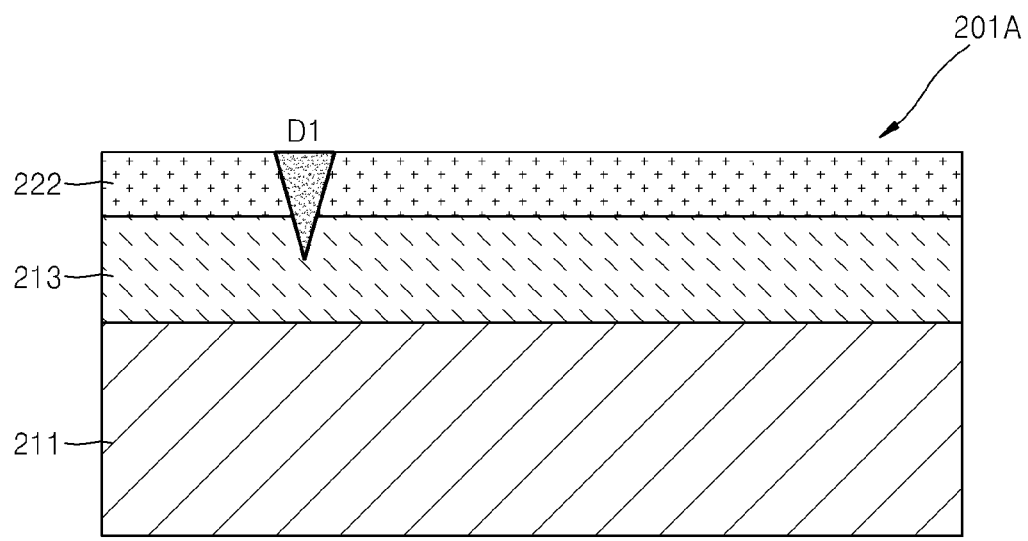
FIGS. 5 through 8 are side views illustrating modified examples of FIG. 3.

Referring to FIG. 5, a first case 201A may include the inside layer 211 and the metal layer 213. The nylon layer 222 may be formed on the metal layer 213. The nylon layer 222 may be a colored layer having a color different from that of the metal layer 213. The nylon layer 222 may have a color complementary to that of the metal layer 213 and may be, for example, black. Accordingly, when the first defect D1, which partially exposes the nylon layer 222 and the metal layer 213, occurs, the color of the nylon layer 222 and the color of the metal layer 213 contrast each other and thus an observer or a sensor may detect the first defect D1.

Figure 6:
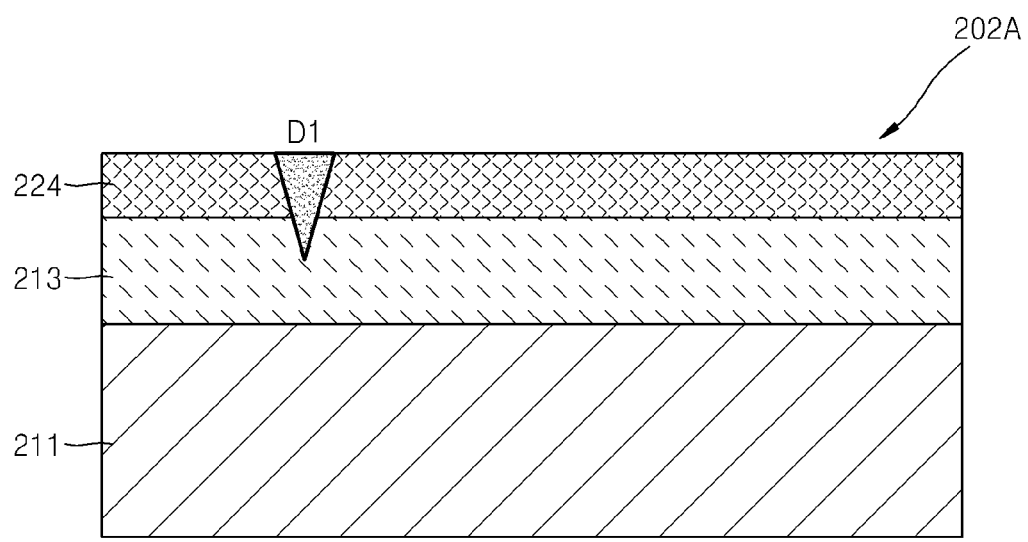

Referring to FIG. 6, a first case 202A may include the inside layer 211 and the metal layer 213. The PET layer 224 may be formed on the metal layer 213. The PET layer 224 may be a colored layer having a color different from that of the metal layer 213. The PET layer 224 may have a color complementary to that of the metal layer 213 and may be, for example, black.

Figure 7:
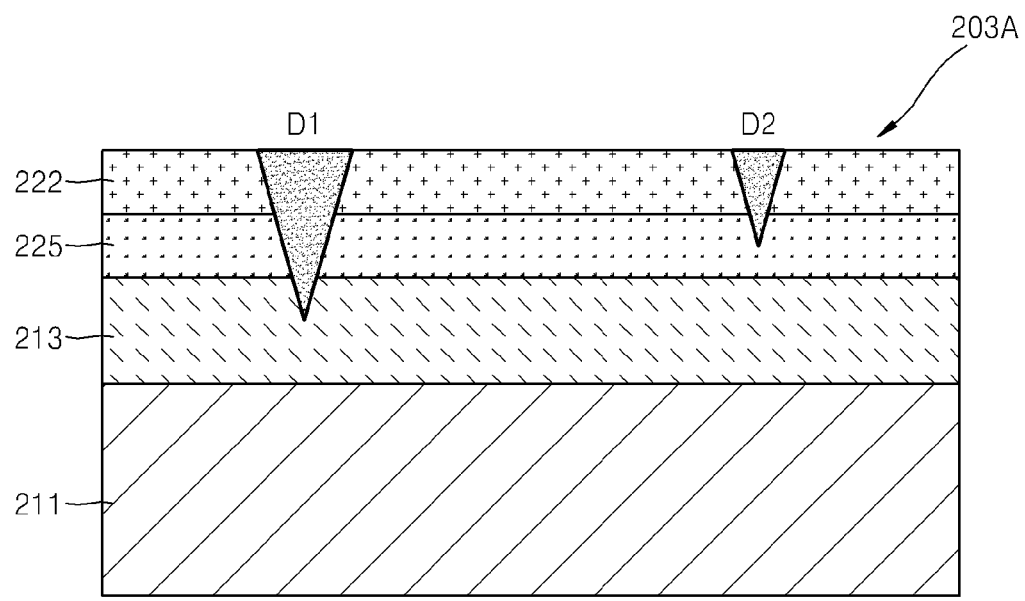

Referring to FIG. 7, a first case 203A may include the inside layer 211 and the metal layer 213. The PE layer 225 and the nylon layer 222 may be formed on the metal layer 213. At least one of the PE layer 225 and the nylon layer 222 may be a colored layer having a color different from that of the metal layer 213. Accordingly, when the first defect D1, which partially exposes the metal layer 213, occurs, the first defect D1 may be easily detected by at least one of the PE layer 225 and the nylon layer 222 having a color different from that of the metal layer 213.

In other embodiments, the PE layer 225 and the nylon layer 222 may have different colors. Accordingly, when the second defect D2, which does not expose the metal layer 213, occurs, the second defect D2 may be detected by the PE layer 225 and the nylon layer 222 having different colors.

Figure 8:
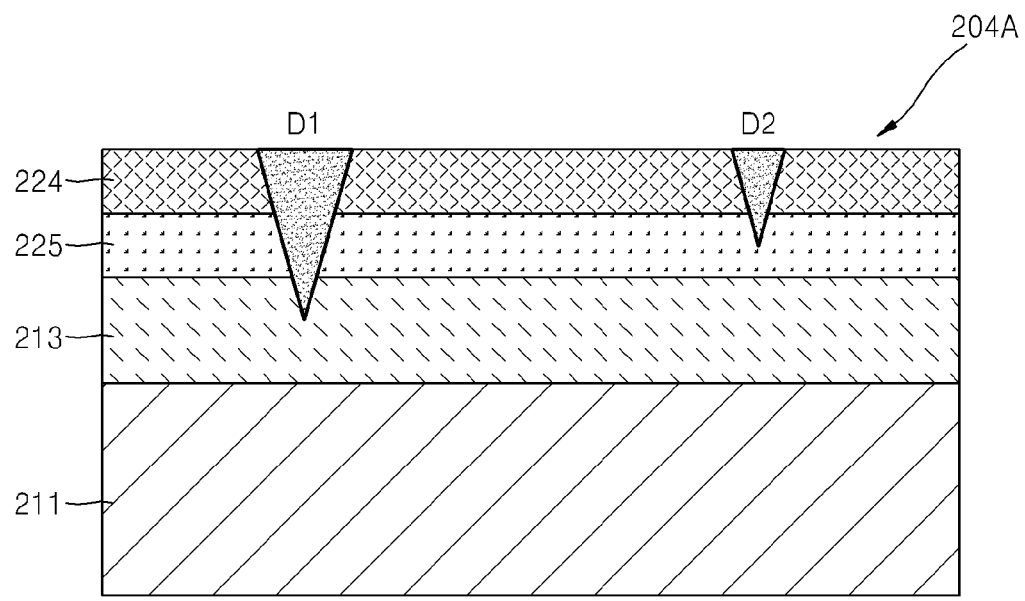

Referring to FIG. 8, a first case 204A may include the inside layer 211 and the metal layer 213. The PE layer 225 and the PET layer 224 may be formed on the metal layer 213. At least one of the PE layer 225 and the PET layer 224 may be a colored layer having a color different from that of the metal layer 213. Accordingly, when the first defect D1, which partially exposes the metal layer 213, occurs, the first defect D1 may be easily detected by at least one of the PE layer 225 and the PET layer 224 having a color different from that of the metal layer 213. In some embodiments, the PE layer 225 and the PET layer 224 may have different colors. Accordingly, when the second defect D2, which does not expose the metal layer 213, occurs, the second defect D2 may be detected by the PE layer 225 and the PET layer 224 having different colors.

The modified examples illustrated in FIGS. 5 through 8 are only some examples according to various embodiments of the present invention.

Figure 9:
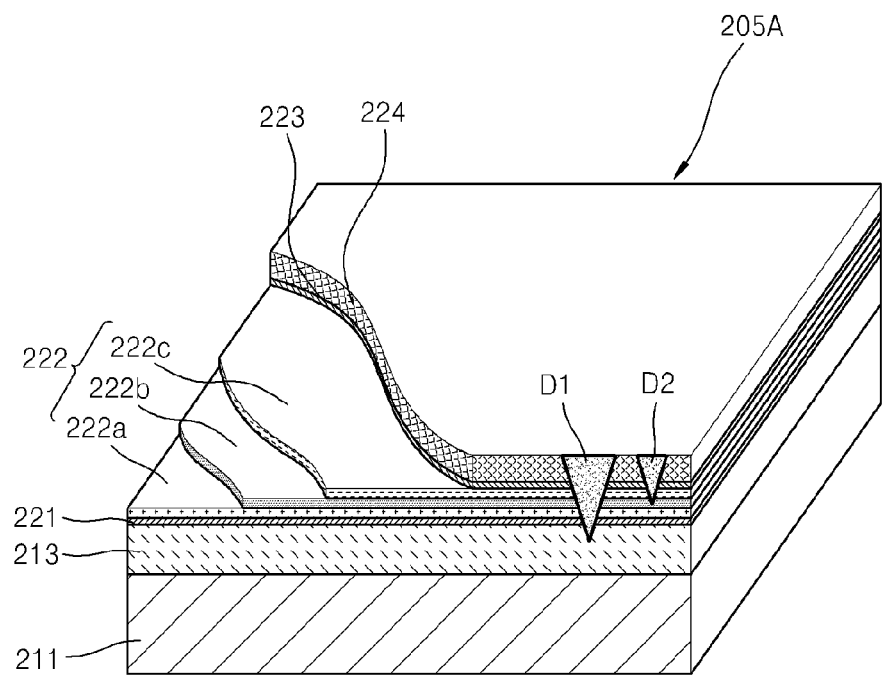
FIG. 9 is an exploded perspective view illustrating another modified example of FIG. 3.

The outside layer 220 includes colored layers having different colors and the colored layers may be formed of the same material, or formed of different materials. FIG. 9 is an exploded perspective view illustrating another modified example of FIG. 3. A first case 205A may include the inside layer 211, the metal layer 213, the first adhesive layer 221, the nylon layer 222, the second adhesive layer 223, and the PET layer 224. As shown in FIG. 9, the nylon layer 222 may include a first nylon layer 222a, a second nylon layer 222b, and a third nylon layer 222c. The first nylon layer 222a, the second nylon layer 222b, and the third nylon layer 222c may be formed of the same material but may have colors different from each other. The colors different from each other may be predetermined colors and may be, for example, colors that sequentially change, or complementary colors.

In some embodiments, the first nylon layer 222a may be navy, the second nylon layer 222b may be wine, and the third nylon layer 222c may be yellow. Thus, the third nylon layer 222c, which is disposed as an uppermost layer and is navy, is viewed when viewing the first case 205A. If the first defect D1, which partially exposes the metal layer 213, occurs, the third nylon layer 222c, which is navy, contrasts with the metal layer 213 and thus the first defect D1 may be detected. Also, if the second defect D2, which does not expose the metal layer 213, occurs, the depth of the second defect D2 and existence of the second defect D2 may be identified through a contrast of exposed colors. For example, when the first nylon layer 222a is exposed by a defect, the first nylon layer 222a, which is yellow, the second nylon layer 222b, which is wine, and the third nylon layer 222c, which is navy contrast each other and thus the defect may be detected. In FIG. 9, it is illustrated that the nylon layer 222 includes three colored layers. In other embodiments, the nylon layer 222 may include at least two colored layers. In yet other embodiments, not only the nylon layer 222 but also at least one layer disposed on the metal layer 213 may include colored layers. Another modified example is illustrated in FIG. 10.

Figure 10:
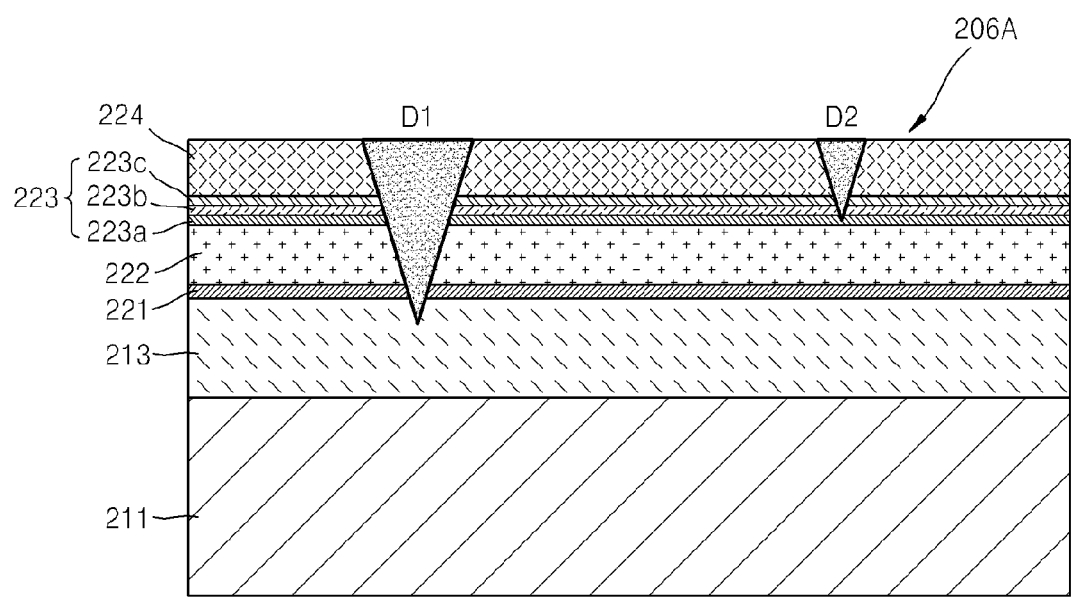
FIG. 10 is a side view illustrating another modified example of FIG. 3.

FIG. 10 is a side view illustrating another modified example of FIG. 3. Referring to FIG. 10, the second adhesive layer 223 may include at least two adhesive layers. In some embodiments, the second adhesive layer 223 may include a second adhesive sublayer 223a, a second adhesive sublayer 223b, and a second adhesive sublayer 223c. The adhesive sublayers 223a, 223b, and 223c may have different colors.

The packing case 200 may be manufactured after providing the inside layer 211, providing the metal layer 213 to cover the inside layer 211, and providing the outside layer 220 having a colored layered to cover the metal layer 213.

An external defect generated on the packing case 200 may be observed by the naked eye of an observer, or by a sensor. External defects of the first case 200A and the second case 200B may also be examined. While the packing case 200 is manufactured, or while a secondary battery in which an electrode assembly and an electrolyte are sealed in the packing case 200 is manufactured, the packing case 200 may be examined for external defects. Detecting of external defects may be automated and thus efficiency may be increased.

Figure 11:
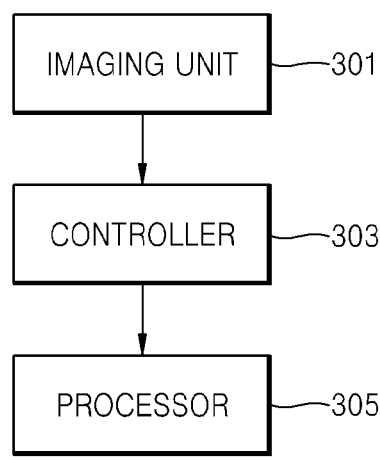
FIG. 11 is a flowchart illustrating treating of an external defect on a case.

FIG. 11 is a flowchart illustrating treating of an external defect on the packing case 200. The packing case 200 may be examined for external defects by a sensor such as an imaging unit 301, while the packing case 200 or a secondary battery including the packing case 200 is manufactured. When a defect is detected by the imaging unit 301, a controller 303 may instruct a processor 305 to operate according to a predetermined process. The processor 305 may perform the predetermined process according to the instruction of the controller 303. In some embodiments, the processor 305 may perform a series of tasks such as marking the defect on the packing case 200 or separating the packing case 200 from other packing cases and then separately storing the defective packing case 200. The outside layer 220 disposed outside of the metal layer 213 includes at least one colored layer and thus the controller 303 may easily sense the defect of the packing case 200.

As described above, according to the one or more embodiments of the present invention, when the packing case for a battery and a secondary battery including the same have outside defects, colors in the case that correspond to where the defects occur are viewed and thus an observer may easily identify the defects.

It should be understood that the embodiments described herein should be considered in a descriptive sense only and not for purposes of limitation. Descriptions of features or aspects within each embodiment should typically be considered as available for other similar features or aspects in other embodiments.

What is claimed is:

1. A method of manufacturing a secondary battery, the method comprising:
    examining an outer side of a packing case for a battery;
    determining the presence of a defect based on an observed color difference between layers of the packing case of the battery, wherein the packing case comprises:
        an inside layer,
        an outside layer, and
        a metal layer formed between the inside and the outside layers,
        wherein the outside layer comprises multiple sub-layers, wherein at least one of the sub-layers has a color complementary to a color of the metal layer, wherein at least one sub-layer is black and wherein at least two sub-layers have colors complementary to one another; and
    processing the packing case of the battery on which the defect is determined to be present.

2. A packing case for a battery comprising:
    an inside layer;
    an outside layer; and
    a metal layer formed between the inside and the outside layers,
    wherein the outside layer comprises multiple sub-layers, wherein at least one sub-layer is black, wherein at least one sub-layer has a color complementary to that of the metal layer, and wherein at least two of the remaining sub-layers have colors complementary to one another.

3. The packing case of claim 2, wherein at least one sub-layer has a color complementary to that of an adjacent layer.

4. The packing case of claim 2, wherein the multiple sub-layers have different colors from one another and are formed of different materials from one another.

5. The packing case of claim 2, wherein the multiple sub-layers have different colors from one another and are formed of the same material.

6. The packing case of claim 2, wherein the outside layer comprises at least one of a nylon sub-layer and a PET sub-layer.

7. The packing case of claim 6, wherein adhesive layers are interposed between at least one of the metal layer and the nylon sub-layer, the PET sub-layer and the nylon sub-layer, and the metal layer and the PET sub-layer.

8. The packing case of claim 7, wherein the adhesive layers each have at least two different colored sub-layers.

9. The packing case of claim 6, wherein the nylon sub-layer comprises at least two different colored sub-layers.

10. The packing case of claim 6, wherein the outside layer comprises a first adhesive layer, the nylon sub-layer, a second adhesive layer, and the PET sub-layer formed on the metal layer in a sequence.

11. The packing case of claim 10, wherein at least one of the nylon sub-layer, the first adhesive layer, and the second adhesive layer is black.

12. The packing case of claim 10, wherein at least one of the first adhesive layer, the nylon sub-layer, and the second adhesive layer has a color complementary to that of the PET sub-layer.

13. The packing case of claim 10, wherein at least one of the first adhesive layer and the second adhesive layer has at least two different colored sub-layers.

14. The packing case of claim 2, wherein the outside layer comprises at least one of a nylon sub-layer and a PE sub-layer formed on the metal layer.

15. The packing case of claim 14, wherein the outside layer comprises the PE sub-layer and the nylon sub-layer formed on the metal layer in a sequence.

16. The packing case of claim 2, wherein the outside layer comprises at least one of a PET sub-layer and a PE sub-layer formed on the metal layer.

17. The packing case of claim 16, wherein the outside layer comprises the PE sub-layer and the PET sub-layer formed on the metal layer in a sequence.

18. A secondary battery comprising the packing case of claim 2.

* * * * *